(12) United States Patent
Van Rotterdam (10) Patent No.: US 11,556,699 B2
(45) Date of Patent: Jan. 17, 2023

(54) DATA MIGRATION ACROSS SAAS APPLICATIONS

(71) Applicant: CITRIX SYSTEMS, INC., Fort Lauderdale, FL (US)

(72) Inventor: Jeroen Mattijs Van Rotterdam, Fort Lauderdale, FL (US)

(*) Notice: Subject to any disclaimer, the term of this patent is extended or adjusted under 35 U.S.C. 154(b) by 358 days.

(21) Appl. No.: 16/266,209

(22) Filed: Feb. 4, 2019

(65) Prior Publication Data
US 2020/0250262 A1     Aug. 6, 2020

(51) Int. Cl.
*G06F 40/174* (2020.01)
*G06F 9/451* (2018.01)
*G06N 20/00* (2019.01)
*G06F 40/205* (2020.01)

(52) U.S. Cl.
CPC ............ *G06F 40/174* (2020.01); *G06F 9/451* (2018.02); *G06F 40/205* (2020.01); *G06N 20/00* (2019.01)

(58) Field of Classification Search
CPC ...... G06F 40/174; G06F 9/451; G06F 40/205; G06N 20/00
See application file for complete search history.

(56) References Cited

U.S. PATENT DOCUMENTS

| | | | | |
|---|---|---|---|---|
| 7,210,098 B2* | 4/2007 | Sibal | ...................... | G06F 16/957 715/205 |
| 7,216,351 B1* | 5/2007 | Maes | ....................... | G06F 9/545 718/100 |
| 7,379,996 B2* | 5/2008 | Papatla | ................... | H04L 29/06 709/218 |
| 7,406,657 B1* | 7/2008 | Callaghan | ............... | G06F 3/167 715/225 |
| 7,457,807 B2* | 11/2008 | O'Conor | ................ | G06Q 10/06 |
| 7,739,117 B2* | 6/2010 | Ativanichayaphong | ...................... | G10L 15/26 704/270.1 |
| 7,805,495 B2* | 9/2010 | Marmaros | ........... | G06F 16/9562 709/217 |
| 8,055,504 B2* | 11/2011 | Cross | ............................ | 704/270 |
| 8,073,700 B2* | 12/2011 | Jaramillo | ............. | G06F 16/9577 704/270.1 |

(Continued)

OTHER PUBLICATIONS

Caccia et al., "Multimodal browsing using VoiceXML" Jun. 23, 2003, Proceedings of SPIE vol. 5150 (2003).*

(Continued)

*Primary Examiner* — Debbie M Le
*Assistant Examiner* — Huen Wong (57) ABSTRACT

A client computing device includes at least one display, an embedded browser that includes first and second browsers, a migration user interface (UI) control and a processor. The first browser is to access a page from a source application for display, and the second browser is to access a form from a target application for display. The processor cooperates with the embedded browser in response to a user selecting the migration UI control to extract data from the displayed page, analyze the extracted data to determine a context of the data, and analyze the displayed form for target form fields. A pattern matching algorithm matches at least a portion of the extracted data to the target form fields. The matched extracted data is migrated to the displayed form as target data values associated with the target form fields.

19 Claims, 8 Drawing Sheets

(56) References Cited

U.S. PATENT DOCUMENTS

| | | | | |
|---|---|---|---|---|
| 8,171,390 | B1* | 5/2012 | Channakeshava | G06F 40/174 715/205 |
| 8,225,191 | B1* | 7/2012 | Kalman | G06F 16/954 715/203 |
| 8,392,617 | B1* | 3/2013 | Weber | H04L 67/02 709/248 |
| 8,615,545 | B1* | 12/2013 | Lakhdhir | G06F 9/451 709/203 |
| 8,850,010 | B1* | 9/2014 | Qureshi | H04L 63/0815 709/225 |
| 9,176,744 | B2 | 11/2015 | Lee | |
| 9,538,345 | B2 | 1/2017 | Sah et al. | |
| 9,904,717 | B2* | 2/2018 | Anglin | G06F 16/27 |
| 2002/0026478 | A1* | 2/2002 | Rodgers | G06F 8/65 709/205 |
| 2003/0061286 | A1* | 3/2003 | Lin | H04L 69/329 709/205 |
| 2003/0120651 | A1* | 6/2003 | Bernstein | G06F 16/86 |
| 2003/0182622 | A1* | 9/2003 | Sibal | G06F 16/957 715/205 |
| 2004/0015401 | A1* | 1/2004 | Lee | G06Q 20/20 705/16 |
| 2004/0015523 | A1* | 1/2004 | Guest | G06F 16/957 |
| 2004/0054715 | A1* | 3/2004 | Cesario | H04L 67/22 709/203 |
| 2007/0250841 | A1* | 10/2007 | Scahill | G06F 9/542 719/320 |
| 2007/0256005 | A1* | 11/2007 | Schneider | G06F 40/134 |
| 2009/0164581 | A1* | 6/2009 | Bove | G06F 16/954 709/205 |
| 2010/0082747 | A1* | 4/2010 | Yue | G06F 16/954 709/204 |
| 2011/0219077 | A1* | 9/2011 | Burckart | G06F 15/16 709/205 |
| 2012/0089659 | A1* | 4/2012 | Halevi | G06F 3/04842 709/201 |
| 2012/0159307 | A1* | 6/2012 | Chung | G06F 16/958 715/234 |
| 2013/0325611 | A1* | 12/2013 | Delug | G06Q 30/0267 705/14.55 |
| 2014/0075280 | A1* | 3/2014 | Laakmann | G06F 16/00 715/225 |
| 2014/0229318 | A1* | 8/2014 | Natarajan | G06F 16/93 705/26.5 |
| 2016/0350391 | A1* | 12/2016 | Vijayan | G06F 3/0619 |
| 2017/0111457 | A1* | 4/2017 | Rivera | H04L 67/148 |
| 2017/0262430 | A1 | 9/2017 | Michelson et al. | |
| 2019/0098096 | A1* | 3/2019 | Mocanu | G06F 16/95 |
| 2019/0342400 | A1* | 11/2019 | Van Rotterdam | G06F 9/461 |
| 2020/0120159 | A1* | 4/2020 | Momchilov | G06F 9/4856 |
| 2020/0142544 | A1* | 5/2020 | Fleck | G06F 9/451 |
| 2020/0145425 | A1* | 5/2020 | Chauhan | H04W 12/00503 |
| 2020/0153878 | A1* | 5/2020 | Chauhan | H04L 67/42 |
| 2020/0153928 | A1* | 5/2020 | Chauhan | H04L 67/104 |
| 2020/0192470 | A1* | 6/2020 | Van Rotterdam | G06F 3/013 |
| 2020/0311176 | A1* | 10/2020 | Ou | G06F 9/452 |
| 2021/0289036 | A1* | 9/2021 | Van Rotterdam | H04L 67/02 |

OTHER PUBLICATIONS ntweekly.com, "Enable Directory Browsing in IIS 10 And Windows Server 2016" Jul. 21, 2017, ntweekly.com (Year: 2017); retrieved at https://www.ntweekly.com/2017/07/21/enable-directory-browsing-in-iis-10-and-windows-server-2016/.* interserver.net, "How to Create Websites in IIS" Nov. 25, 2015, interserver.net (Year: 2015); retrieved at https://www.interserver.net/tips/kb/how-to-create-website-in-iis/.*

Anonymous "Google Chrome—Copy Form Fields Values And Paste Them In Another Form/Tab?—Stack Overflow" URL:https://stackoverflow.com/questions/23695253/copy-form-fields-values-and-paste-them-In-anotherform-tab; May 6, 2016; pp. 2.

* cited by examiner

| Prefix | First Name | Last Name | Company | email | Street | City | State | Zip Code | Job Title |
|---|---|---|---|---|---|---|---|---|---|
| Mr. | John | Doe | A Company, Inc. | J.Doe@accompany.com | 12 Jane Street | Ft. Lauderdale | FL | 33301 | Purchasing Manager |

CREATE NEW CONTACT

DATA MIGRATION ACROSS SAAS APPLICATIONS

TECHNICAL FIELD

The present disclosure relates to computer applications, and more particularly, to migrating data from one Software as a Service (SaaS) application to another SaaS application with similar functionality.

BACKGROUND

Software as a Service (SaaS) is a computing approach to software delivery by which applications are centrally hosted on one or more third-party servers (e.g., in the cloud), and are typically provided on a subscription basis to users. SaaS applications are offered for numerous areas, including business, accounting, and even gaming applications.

SaaS applications are typically accessed on client computing devices via an internet browser. On occasion, there is a need to migrate data from a source SaaS application to a target SaaS application with similar functionality. This is typically an all or nothing process that requires an extraction of the database on the server providing the source SaaS application, and utilization of a migration utility to input the data in the target SaaS application.

Data migration between different SaaS applications can be costly, particularly when IT personnel are involved, and is not always successful. Also, irrelevant data is usually transferred along with the relevant data, with the irrelevant data resulting in what is considered garbage data in the target SaaS application.

SUMMARY

A client computing device includes at least one display, an embedded browser that includes first and second browsers, a migration user interface (UI) control and a processor. The first browser is to access a page from a source application for display based on user input, and the second browser is to access a form from a target application for display based on user input. The processor cooperates with the embedded browser in response to the user selecting the migration UI control to extract data from the displayed page, analyze the extracted data to determine a context of the data, and analyze the displayed form for target form fields. A pattern matching algorithm matches at least a portion of the extracted data to the target form fields. The matched extracted data is migrated to the displayed form as target data values associated with the target form fields.

The client computing device is advantageously configured to allow a gradual migration of data from a source application to a target application based on migrating data from one web page at a time. This leads to a more accurate data migration since the user is able to verify the migrated data before it is stored within the target application.

The client computing device further includes an input device coupled to the processor. The migrated matched extracted data is saved in the target application after verification by the user via the input device. Also, new data may be entered via the input device by the user for target form fields that did not receive matched extracted data.

The pattern matching algorithm may be a machine learning pattern matching algorithm. The page from the source application may be a web page. The migration UI control may be configured as a hot key.

The client computing device further includes a memory coupled to the processor, and wherein the extracted data from the displayed page is stored in the memory.

The source application may be SaaS application, and the target application may be a SaaS application. The source and target SaaS applications have similar functionality.

Another aspect is directed to a method for operating a client computing device comprising at least one display, an embedded browser that includes first and second browsers, a migration user interface (UI) control, and a processor. The method comprises operating the first browser to access a page from a source application for display on the at least one display based on user input, and operating the second browser to access a form from a target application for display on the at least one display based on user input.

The method further includes operating the processor to cooperate with the embedded browser in response to the user selecting the migration UI control to extract data from the displayed page, analyze the extracted data to determine a context of the data, and analyze the displayed form for target form fields. A pattern matching algorithm is operated to match at least a portion of the extracted data to the target form fields. The matched extracted data is migrated to the displayed form as target data values associated with the target form fields.

Yet another aspect is directed to a non-transitory computer readable medium for operating a client computing device comprising at least one display, an embedded browser that includes first and second browsers, a migration user interface (UI) control, and a processor, and with the non-transitory computer readable medium having a plurality of computer executable instructions for causing the client computing device to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein.

Rather, these embodiments are provided so that this disclosure will be thorough and complete. Like numbers refer to like elements throughout.

As will be discussed below, a client computing device is advantageously configured to allow a gradual migration of data from a source application to a target application based on migrating data from one web page at a time. This leads to a more accurate data migration since the user is able to verify the migrated data before it is stored within the target application.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
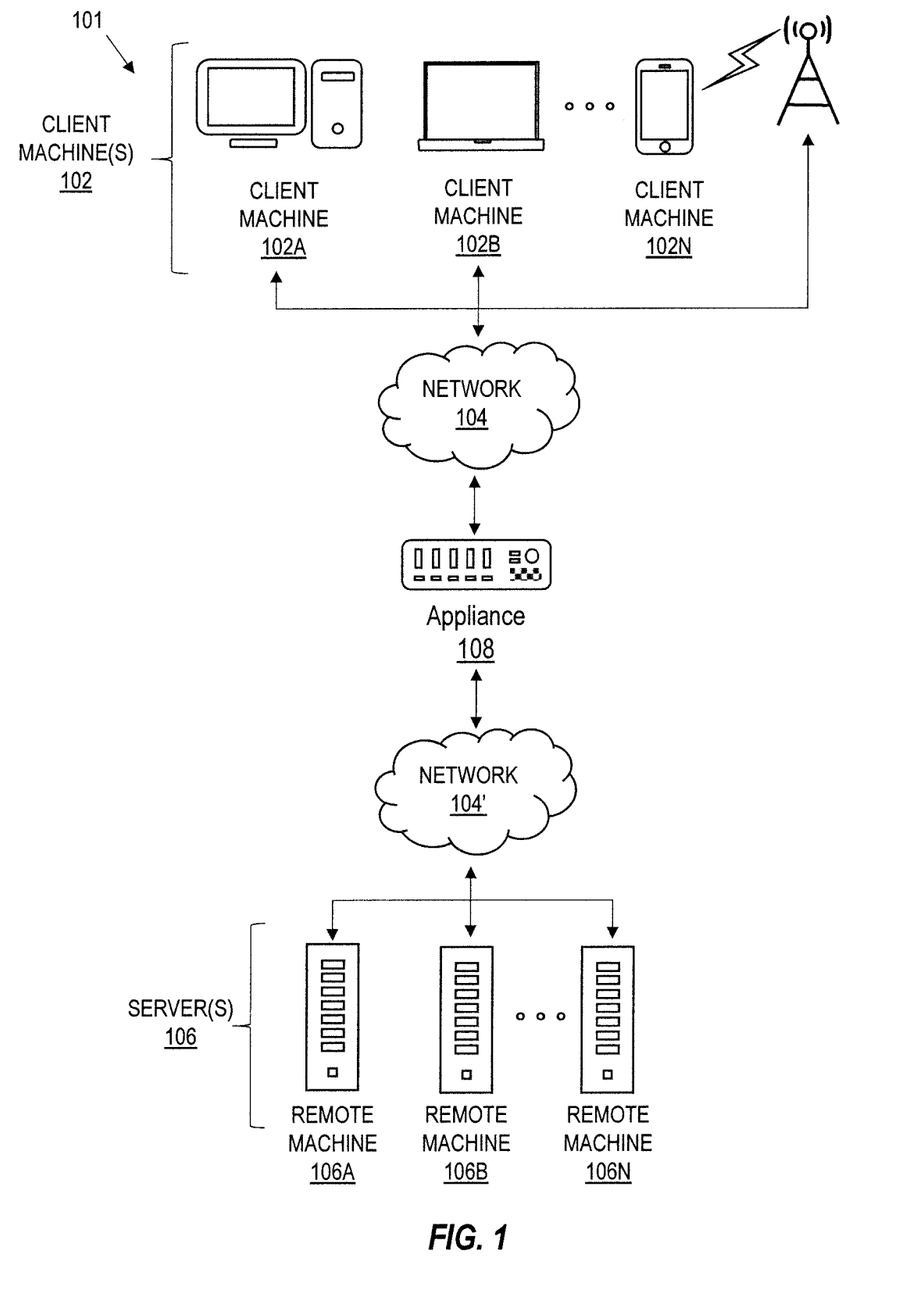
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
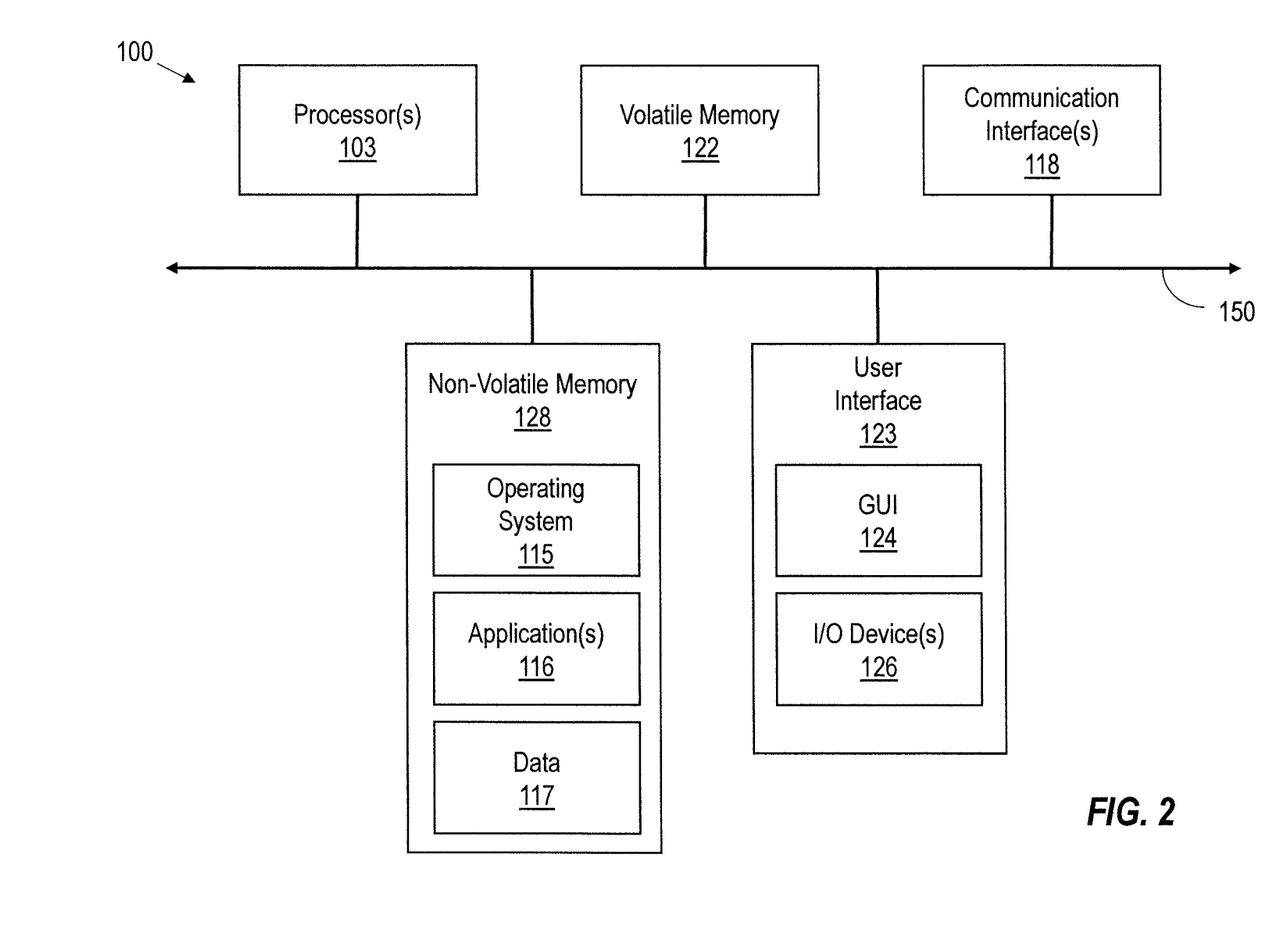
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
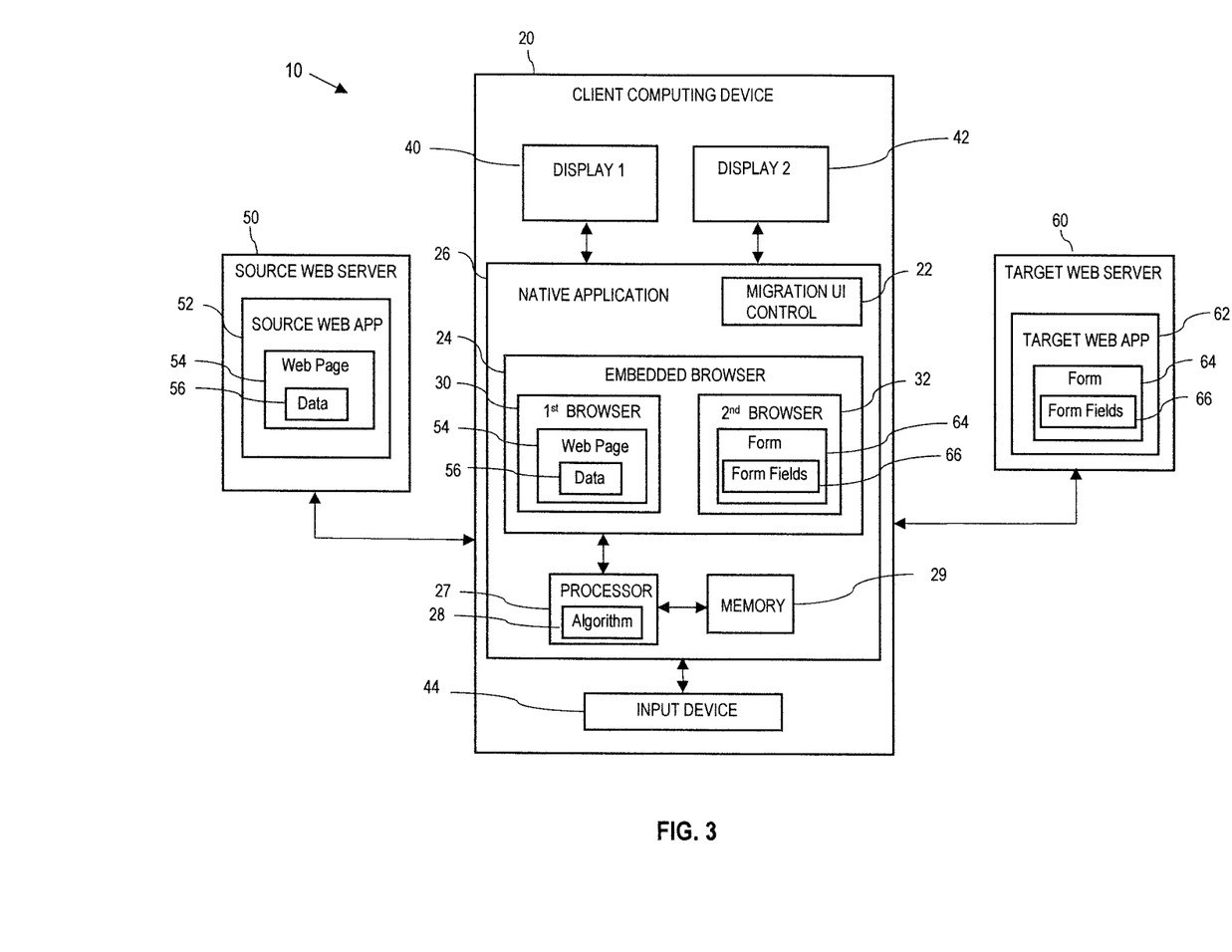
FIG. 3 is a block diagram of a computing system that includes a client computing device with a migration UI control in which various aspects of the disclosure may be implemented.

Referring initially to FIG. 3, a computing system 10 includes a client computing device 20 that is configured to migrate data from a source web application 52 to a target web application 62 with similar functionality. The source and target web applications 52, 62 generally include Software as a Service (SaaS) applications.

Traditionally, data migration between different SaaS applications can be costly, particularly when IT personnel are involved, and is not always successful. Also, irrelevant data is usually transferred along with the relevant data, with the irrelevant data resulting in what is considered garbage data in the target SaaS application 62.

As will be discussed in detail below, this process is improved based on user selection of a migration user interface (UI) control 22 to initiate data migration between a displayed web page 54 from the source web application 52 to a form 64 in a target web application 62. The user verifies the migrated data before it is stored within the target web application 62, which leads to a more accurate data migration. As such, the systems and methods set forth herein advantageously provide improved performance within a virtualized and/or enterprise computing environment.

The illustrated computing system 10 includes a source web server 50 providing the source web application 52 that includes data 54 that is to be migrated, and a target web server 60 providing the target web application 62 that is to receive the migrated data. As noted above, the source and target web applications 52, 62 generally include Software as a Service (SaaS) applications, for example.

The client computing device 20 includes a first display 40 and a second display 42. An embedded browser 24 includes a first browser 30 to access a web page 54 from the source web application 52 for display on the first display 40 based on user input, and a second browser 32 to access a form 64 from the target web application 62 for display on the second display 42 based on user input.

The client computing device 20 includes a migration UI control 22. The migration UI control 22 may be in the form of a hot key or a drop down menu selection, for example. Since the migration UI control 22 is configured as a hot key, it is used to trigger a sequence of repetitive actions with a single user input, as readily appreciated by those skilled in the art.

A processor 27 is configured to cooperate with the embedded browser 24 in response to the user selecting the migration UI control 22 to perform the data migration. The embedded browser 24 is a browser embedded within a native application 26. For example, Citrix Receiver and Citrix Workspace App are native applications that may be installed on the client computing devices 20.

The processor 27 extracts data 56 from the displayed page 54, analyzes the extracted data 56 to determine a context of the data, and analyzes the displayed form 64 for target form fields 66. The processor 27 operates a pattern matching algorithm 28 to match at least a portion of the extracted data 56 to the target form fields 66, and migrates the matched extracted data to the displayed form 64 as target data values associated with the target form fields 66.

The client computing device 20 includes an input device 44. The input device 44 may be a keyboard or a pointing device, for example. Prior to the user selecting the migration UI control 22, the user operates the first browser 30 via the input device 28 to identify a web page 54 with data 56 that is to be migrated from the source web application 52, and operates the second browser 32 to identify a form 64 that is to receive the migrated data within the target web application 62.

When the user is ready to migrate the data 56, the user selects the migration UI command 22. Since the embedded browser 22 is embedded within the native application 26, this allows selection of the migration UI command 22 to initiate migration of the data 56 from the source web application 52 to the target web application 62.

The source and target web applications 52, 62 are to have similar functionality. For discussion purposes, the source and target web applications 52, 62 are directed to customer relationship management (CRM) applications. CRM applications are focused on sales and support for a company or business.

As an example, a company or business may be replacing one CRM application with a different CRM application. As another example, the company or business may be replacing a current version of a CRM application with an updated version of the same CRM application. For both examples, data is to be migrated between the CRM applications.

Using the first example, one CRM application is being replaced with a different CRM application. More particularly, the source web application 52 may be SalesForce as provided by SalesForce.com, Inc., and the target web application 62 may be Infor CRM as provided by Infor.

Figure 4:
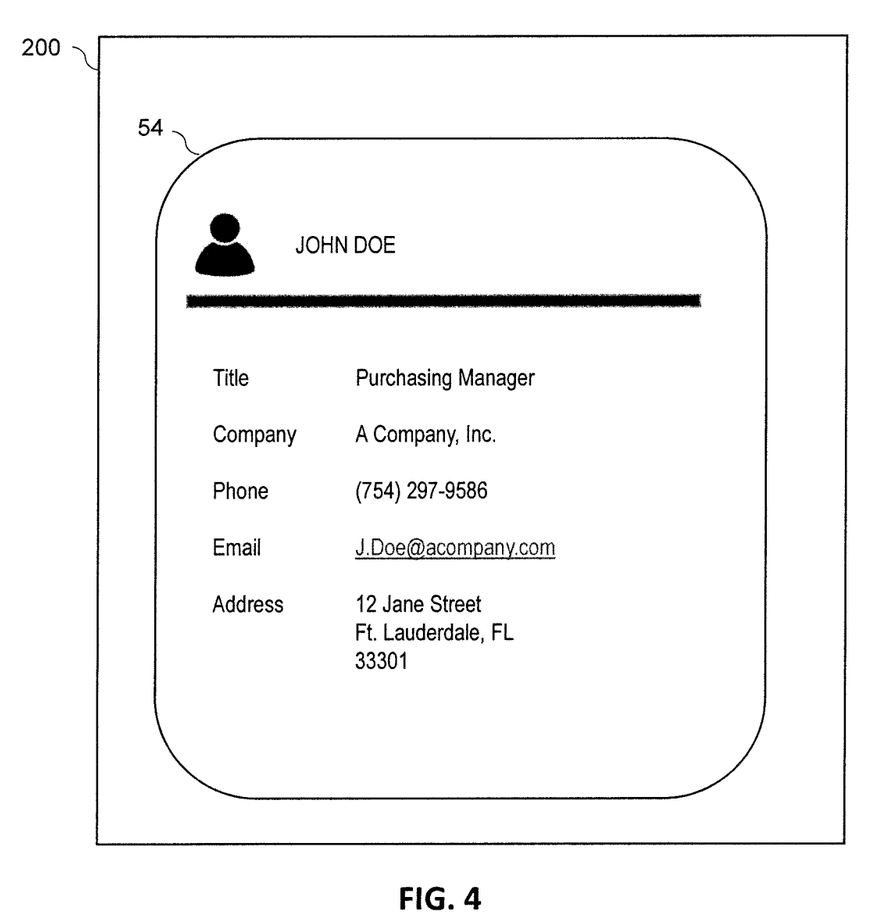
FIG. 4 is an example screen shot of a web page for the source web application illustrated in FIG. 3.
Figure 5:
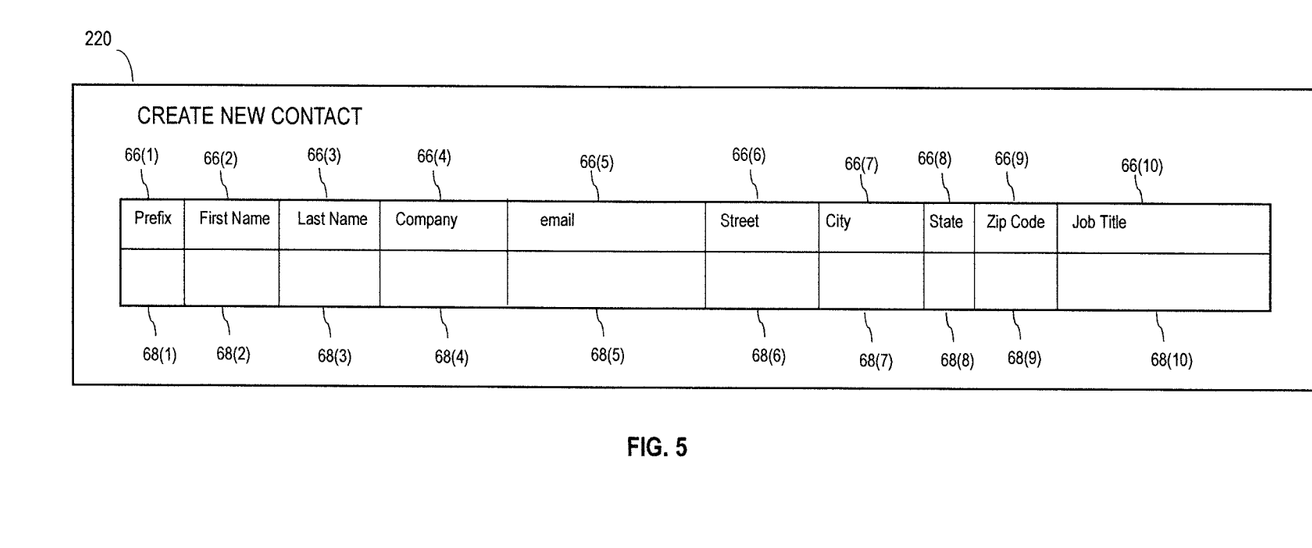
FIG. 5 is an example screen shot of a form with target form fields and target data fields for the target web application illustrated in FIG. 3.
Figure 6:
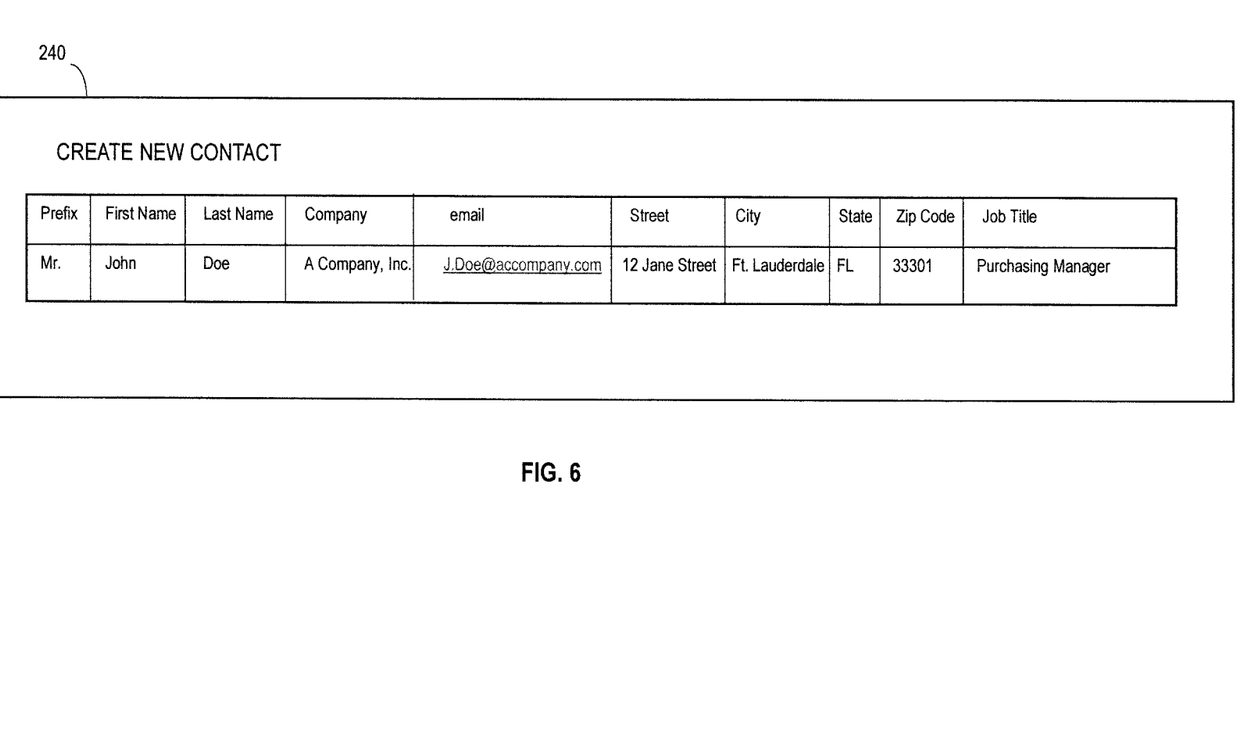
FIG. 6 is the screen shot illustrated in FIG. 5 with data in the target data fields.

Referring now to FIGS. 4-6, an example data migration will be discussed. A screen shot 200 of the web page 54 as provided in FIG. 4 includes data 56 on an existing contact in SalesForce, i.e., the source application 52. The data 56 is to be migrated to Infor CRM, i.e., the target application 62. A screen shot 220 as provided in FIG. 5 of a "create new contact" form 64 in the target application 62 is to receive the data 56.

The screen shot 200 is from the first display 40, and the screen shot 220 is from the second display 42. Even though the screen shots 200, 220 are on separate displays, a single display may be used with a split screen.

When the user selects the migration UI control 22, the processor 27 cooperates with the embedded browser 24 to perform the data migration between the source and target applications 52, 62. The processor 27 extracts the data 56 from the displayed page 54. The extracted data is stored in a memory 29 coupled to the processor 27.

The processor 27 analyzes the extracted data to determine a context of the data. For the displayed web page 54, the context of the displayed data 56 is associated with an existing contact. As such, the analyzing by the processor 27 looks at the extracted data, and then looks at the larger surrounding frame, i.e., the context. Information about a text context can advantageously be used to develop an interpretation.

The processor 27 also analyzes the displayed form 64 for target form fields 66. The target form fields 66 include target form fields 66(1)-66(10). The target form fields 66(1)-66(10) have respective target data fields 68(1)-68(10) associated therewith.

The target data fields 68(1)-68(10) are currently void of any data, but by determining the context of the target form fields 66(1)-66(10), the processor 27 can better match applicable portions of the extracted data from the displayed web page 54.

The processor 27, for example, recognizes the word "zip code" in target data field 68(9). From this context, the processor 27 looks at the extracted data for a group of five numbers that would represent a zip code.

The processor 27 includes a matching algorithm 28 that will take the extracted data and find structure in the data, like grouping or clustering of data. The matching algorithm 28 may be an unsupervised learning algorithm that learns from test data that has not been labeled, classified or categorized. Instead of responding to feedback, an unsupervised learning algorithm identifies commonalities in the extracted data and reacts based on the presence or absence of such commonalities in each piece of data.

In this example, the matching algorithm 28 associates the data grouped with "address" in the displayed web page 54 as being interpreted in the context of an address. An address typically includes a street, city, state and zip code. The matching algorithm 28 will match the five numbers in this grouping, which is being interpreted in the context of a zip code, to the "zip code" target data field 68(9).

Similarly, the matching algorithm 28 continues to match the data grouped with "address" in the displayed web page 54 to the "street" target data field 68(6), the "city" target data field 68(7), and the "state" target data field 68(8).

Since the functionality of the source and target applications 52, 62 are similar, the matching algorithm 28 is trained toward this functionality, which in this case is CRM applications. The matching algorithm 28 will continue to learn and evolve in matching extracted data from a web page 54 in the source application 52 to form fields 66 in the target web application 62.

The matching algorithm 28 will attempt to match the remaining extracted data to other target form fields 66. However, the matching algorithm 28 is not intended to match each of the target form fields 66(1)-66(10) with the data 56 that is extracted from the web page 54. The matching algorithm 28 is intended to migrate a significant amount of the extracted data in the web page 64 to the form 64.

Consequently, the user will be required to not only verify the accuracy of the data that is migrated to the form 64, the user will also need to fill in any of the target data fields 68 that did not receive migrated data. For instance, the "prefix" for target form field 66(1) is directed an additional input for the new contact being created. The user will need to type in Mr., Mrs., or Ms. based on a known gender and preferred status of the person being entered as a new contract.

The matching algorithm 28 will be trained to recognize a person's full name as including a first name and a last name. In this example, the matching algorithm 28 determines that "John Doe" is the name of the contact being created with the migration. Consequently, by analyzing the "first name" target data field 66(2) and the "last name" target data field 66(3), the matching algorithm 28 will separate and match "John Doe" into the "first name" target data field 68(2) and the "last name" target data field 68(3).

A screen shot 240 as provided in FIG. 6 shows the "create new contact" form 64 in the target application 62 as having received all the data necessary to create a new contact. This is based on data migration as performed by the processor 27, and based on user input via the input device 44. Before the data is to be stored in the target application 62, approval or verification by the user is provided by selecting or pressing a prompt associated with the create new contact form 64.

The client computing device 20 is advantageously configured to allow a gradual migration of data from the source application 52 to the target application 62 based on migrating data from one web page 54 at a time. This leads to a more accurate data migration since the user is able to verify the migrated data before it is stored within the target application 62.

Figure 7:
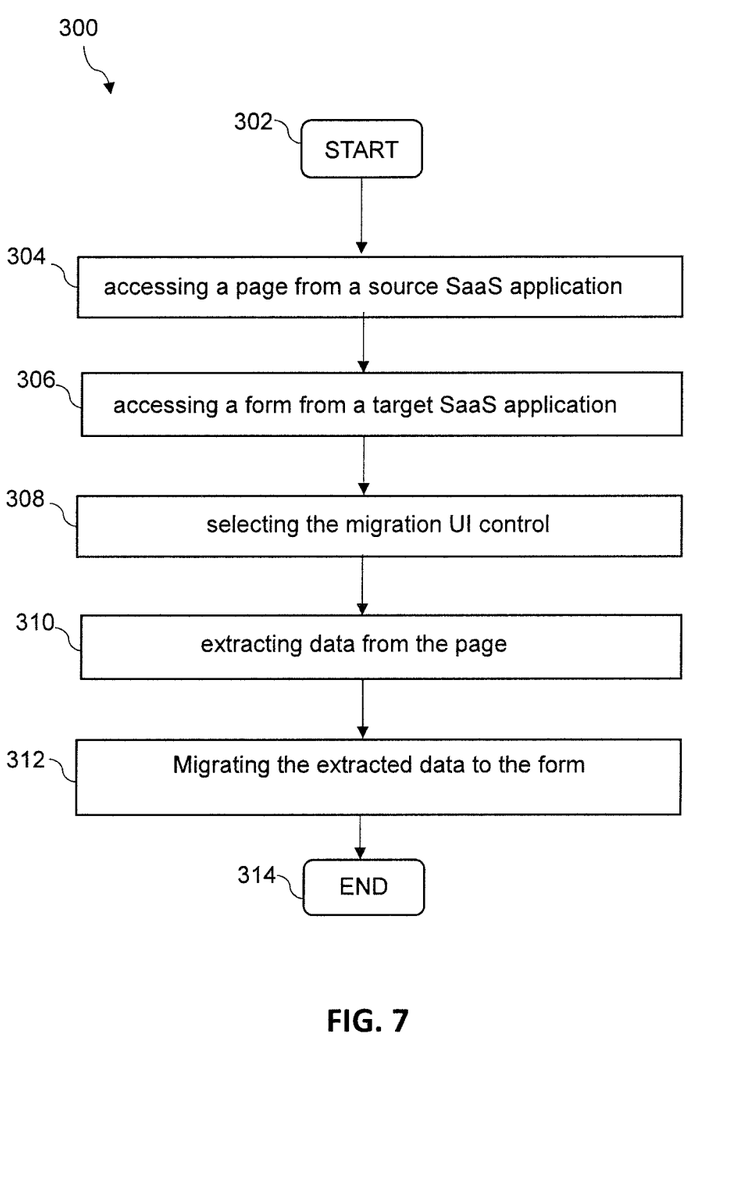
FIG. 7 is a general flowchart illustrating a method for operating the client computing device illustrated in FIG. 3.

Referring now to the flowchart 300 in FIG. 7, and generally speaking, a method for operating a client computing device will be discussed. From the start (Block 302), the method includes accessing a page 54 from a source SaaS application 52 at Block 304, and accessing a form 64 from a target SaaS application 62 at Block 306. The migration UI control 22 is selected at Block 308. Data 56 is extracted from the page 54 at Block 310, and the extracted data is migrated to the form 64. The method ends at Block 210.

Figure 8:
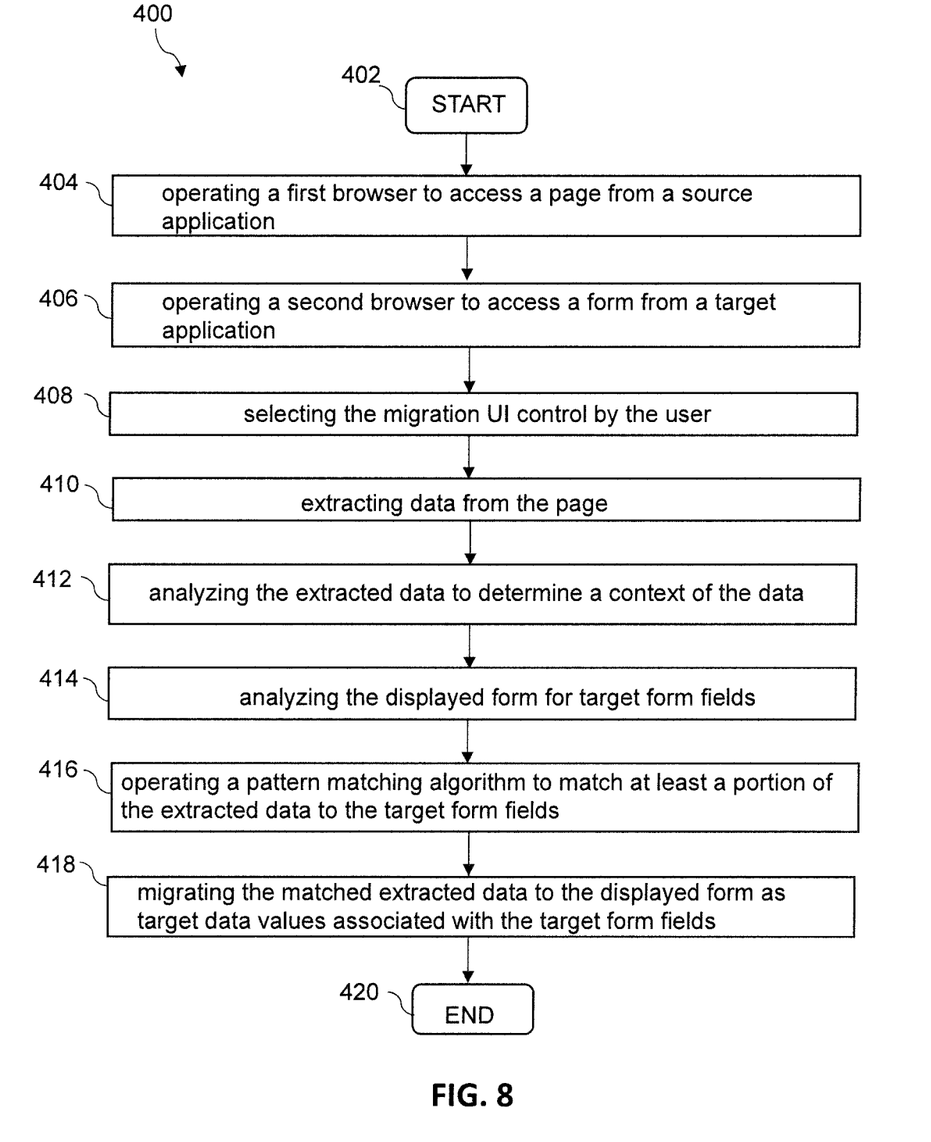
FIG. 8 is a more detailed flowchart illustrating a method for operating the client computing device illustrated in FIG. 3.

Referring now to the flowchart 400 in FIG. 8, more detailed steps for operating the client computing device 20 will be discussed. From the start (Block 402), the method includes operating a first browser 30 to access a page 54 from a source application 52 at Block 404, and operating a second browser 32 to access a form 64 from a target application 62 at Block 406. The migration UI control 22 is selected at Block 408. The method further includes extracting data from the page at Block 410, analyzing the extracted data to determine a context of the data at Block 412, and analyzing the displayed form 64 for target form fields 66 at Block 414. A pattern matching algorithm 28 is operated at Block 416 to match at least a portion of the extracted data to the target form fields 66. The matched extracted data is migrated to the displayed form 64 as target data values 68 associated with the target form fields 66 at Block 418. The method ends at Block 420.

Another aspect is directed to a non-transitory computer readable medium for operating a client computing device 20 comprising an embedded browser 24 that includes first and second browsers 30 and 40, a copy file user interface (UI) control 22 and a processor 27. The non-transitory computer readable medium has a plurality of computer executable instructions for causing the client computing device 20 to Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A client computing device comprising:
   at least one display;
   an embedded browser including
      a first browser to access a page from a source application at a source server based on user input, with the page having data that is visible on said at least one display, and
      a second browser to access a form from a target application at a target server based on user input, with the form having target data fields visible on said at least one display;
   a migration user interface (UI) control displayed on said at least one display; and
   a processor configured to cooperate with said embedded browser in response to the user selecting said displayed migration UI control to perform the following:
      extract the data from the displayed page,
      analyze the extracted data to determine a context of the data after the data having been extracted from the displayed page,
      analyze the displayed form for target form fields based on the context of the data, with the target form fields being associated with the target data fields,
      operate a pattern matching algorithm to match at least a portion of the extracted data to the target form fields, wherein the pattern matching algorithm comprises a machine learning pattern matching algorithm that learns from test data that has not been labeled, classified or categorized and that identifies commonalities in the extracted data from the displayed page, and
      after verification of the matched extracted data by a user of the client computing device, migrate the matched extracted data to the target data fields in the displayed form, with the target data fields void of data prior to the migration, and with the migration being a gradual migration based on migrating data from the source application to the target application one web page at a time.

2. The client computing device according to claim 1 further comprising an input device coupled to said processor, and wherein the migrated matched extracted data is saved in the target application after verification by the user via said input device.

3. The client computing device according to claim 1 further comprising an input device coupled to said processor, and wherein new data is entered via said input device by the user for target form fields that did not receive matched extracted data.

4. The client computing device according to claim 1 wherein the page from the source application comprises a web page.

5. The client computing device according to claim 1 wherein said migration UI control is configured as a hot key.

6. The client computing device according to claim 1 further comprising a memory coupled to said processor, and wherein the extracted data from the displayed page is stored in said memory.

7. The client computing device according to claim 1 wherein the source application comprises a Software as a Service (SaaS) application, and the target application comprises a SaaS application.

8. The client computing device according to claim 1 wherein the source and target applications have similar functionality.

9. A method for operating a client computing device comprising at least one display, an embedded browser that includes first and second browsers, a migration user interface (UI) control, and a processor, the method comprising:
   operating the first browser to access a page from a source application at a source server based on user input, with the page having data that is visible on said at least one display;
   operating the second browser to access a form from a target application at a target server based on user input, with the form having target data fields visible on the at least one display;
   displaying a migration user interface (UI) control; and
   operating the processor to cooperate with the embedded browser in response to the user selecting the displayed migration UI control to perform the following:
      extracting the data from the displayed page,
      analyzing the extracted data to determine a context of the data after the data having been extracted from the displayed page,
      analyzing the displayed form for target form fields based on the context of the data, with the target form fields being associated with the target data fields,
      operating a pattern matching algorithm to match at least a portion of the extracted data to the target form fields, wherein the pattern matching algorithm comprises a machine learning pattern matching algorithm that learns from test data that has not been labeled, classified or categorized and that identifies commonalities in the extracted data from the displayed page, and after verification of the matched extracted data by a user of the client computing device, migrating the matched extracted data to the target data fields in the displayed form, with the target data fields void of data prior to the migration, and with the migration being a gradual migration based on migrating data from the source application to the target application one web page at a time.

10. The method according to claim 9 wherein the client computing device further comprises an input device coupled to the processor, and further comprising saving the migrated matched extracted data in the target application after verification by the user via the input device.

11. The method according to claim 9 wherein the client computing device further comprises an input device coupled to the processor, and further comprising entering new data via the input device by the user for target form fields that did not receive matched extracted data.

12. The method according to claim 9 wherein the page from the source application comprises a web page.

13. The method according to claim 9 wherein the migration UI control is configured as a hot key.

14. The method according to claim 9 wherein the source application comprises a Software as a Service (SaaS) application, and the target application comprises a SaaS application.

15. A non-transitory computer readable medium for operating a client computing device comprising at least one display, an embedded browser that includes first and second browsers, a migration user interface (UI) control, and a processor, and with the non-transitory computer readable medium having a plurality of computer executable instructions for causing the client computing device to perform steps comprising:
  operating the first browser to access a page from a source application at a source server based on user input, with the page having data that is visible on said at least one display;
  operating the second browser to access a form from a target application at a target server based on user input, with the form having target data fields visible on the at least one display;
  displaying a migration user interface (UI) control; and
  operating the processor to cooperate with the embedded browser in response to the user selecting the displayed migration UI control to perform the following:
    extracting the data from the displayed page,
    analyzing the extracted data to determine a context of the data after the data having been extracted from the displayed page,
    analyzing the displayed form for target form fields based on the context of the data, with the target form fields being associated with the target data fields,
    operating a pattern matching algorithm to match at least a portion of the extracted data to the target form fields, wherein the pattern matching algorithm comprises a machine learning pattern matching algorithm that learns from test data that has not been labeled, classified or categorized and that identifies commonalities in the extracted data from the displayed page, and
    after verification of the matched extracted data by a user of the client computing device, migrating the matched extracted data to the target data fields in the displayed form, with the target data fields void of data prior to the migration, and with the migration being a gradual migration based on migrating data from the source application to the target application one web page at a time.

16. The non-transitory computer readable medium according to claim 15 wherein the client computing device further comprises an input device coupled to the processor, and further comprising saving the migrated matched extracted data in the target application after verification by the user via the input device.

17. The non-transitory computer readable medium according to claim 15 wherein the client computing device further comprises an input device coupled to the processor, and further comprising entering new data via the input device by the user for target form fields that did not receive matched extracted data.

18. The non-transitory computer readable medium according to claim 15 wherein the migration UI control is configured as a hot key.

19. The non-transitory computer readable medium according to claim 15 wherein the source application comprises a Software as a Service (SaaS) application, and the target application comprises a SaaS application.

* * * * *